United States Patent [19]

Yu

[11] Patent Number: 5,424,771
[45] Date of Patent: Jun. 13, 1995

[54] VIDEO DISPLAY DEVICE USING LASER GENERATED RADIATION

[75] Inventor: Jae-cheon Yu, Kuro-ku, Rep. of Korea

[73] Assignee: SamSung Electronics Co., Ltd., Kyungki, Rep. of Korea

[21] Appl. No.: 794,478

[22] Filed: Nov. 19, 1991

[30] Foreign Application Priority Data

Jan. 30, 1991 [KR] Rep. of Korea ............. 91-1583

[51] Int. Cl.$^6$ .................................... H04N 9/14
[52] U.S. Cl. ............................. 348/203; 348/760; 359/208; 359/215
[58] Field of Search ............. 358/56, 60, 59, 62, 358/66, 67, 69, 22 PIP, 61, 63, 125, 126, 108, 254; 340/795; 359/205, 208, 215

[56] References Cited

U.S. PATENT DOCUMENTS

| | | | |
|---|---|---|---|
| 3,597,536 | 8/1971 | Fowler | 358/206 |
| 3,721,756 | 3/1973 | Baker | 358/206 |
| 4,084,182 | 4/1978 | Maiman | 358/62 |
| 4,304,092 | 12/1981 | Katzfey | 358/60 |
| 4,611,245 | 9/1986 | Trias | 358/60 |
| 4,635,105 | 1/1987 | Faureau | 340/720 |
| 4,684,996 | 8/1987 | Baumeister | 358/69 |
| 4,686,429 | 8/1987 | Fendley | 358/67 |
| 4,714,830 | 12/1987 | Usui | 359/215 |
| 4,734,779 | 3/1988 | Levis et al. | 358/231 |
| 4,776,654 | 10/1988 | Ishizuka et al. | 359/205 |
| 4,835,601 | 5/1989 | Kobayashi | 358/60 |
| 4,852,957 | 8/1989 | Wakimoto et al. | 359/208 |
| 4,984,091 | 1/1991 | Murata | 358/244 |
| 5,027,413 | 6/1991 | Barnard | 359/125 |
| 5,040,067 | 8/1991 | Yamazaki | 358/22 PIP |
| 5,097,324 | 3/1992 | Tanaka et al. | 358/69 |
| 5,103,334 | 4/1992 | Swanberg | 359/197 |
| 5,142,367 | 8/1992 | Hoag | 358/108 |

FOREIGN PATENT DOCUMENTS 0131677 6/1987 Japan ............. H04N 5/74
2-273782 8/1990 Japan .

Primary Examiner—James J. Groody
Assistant Examiner—Jeffrey S. Murrell
Attorney, Agent, or Firm—Robert E. Bushnell

[57] ABSTRACT

A display device using laser comprises an input path for a composite video signal, a memory for storing the video signal by picture regions divided according to the size of picture, a controller for controlling the scanning position and the division of picture regions, a semiconductor laser for reading out R, G and B signals from the memory, and then scanning laser beams, and a scanning controller for controlling the path of a laser beam. The device displays an optical signal on a wall or large white surface without an additional cathode ray tube and adjusts screen size by controlling the distance between the device and the display surface.

32 Claims, 4 Drawing Sheets

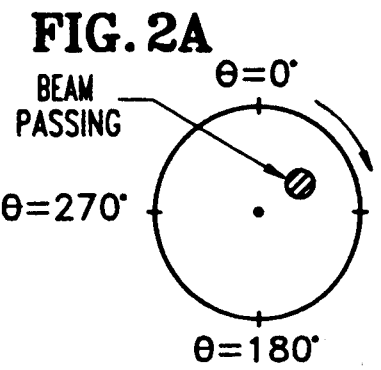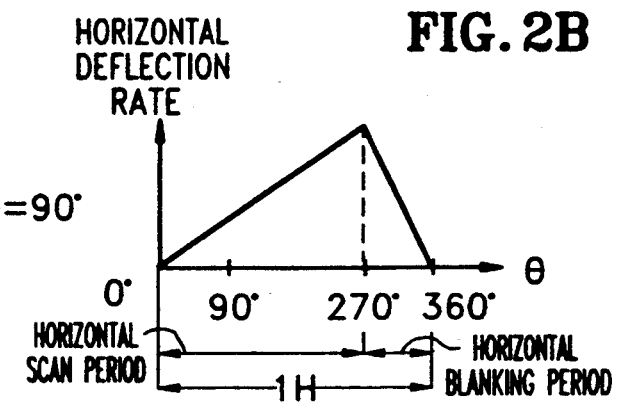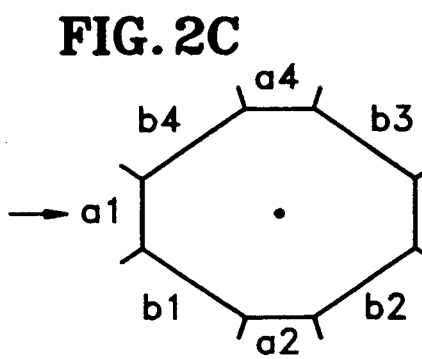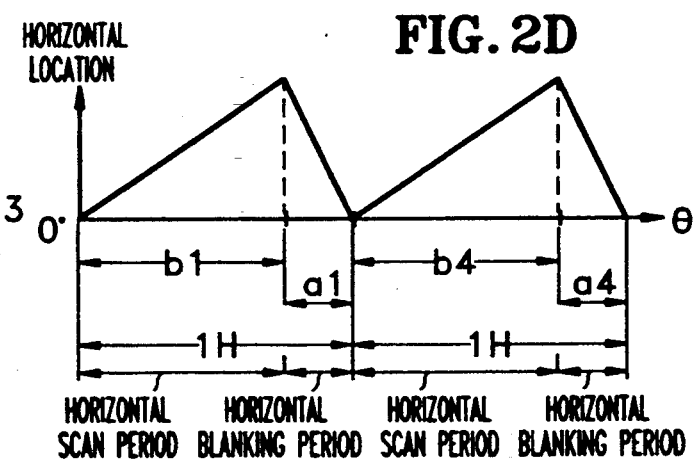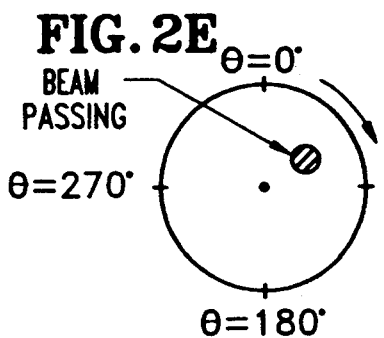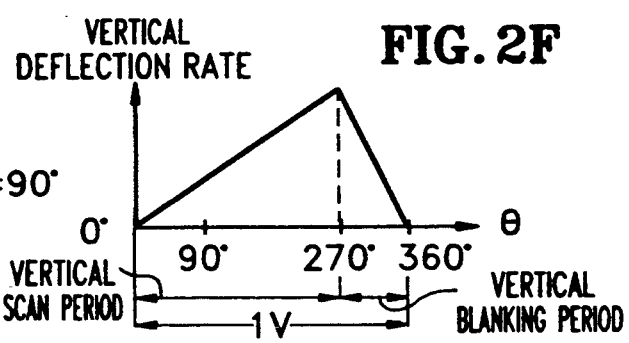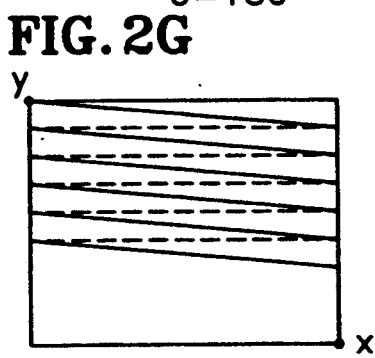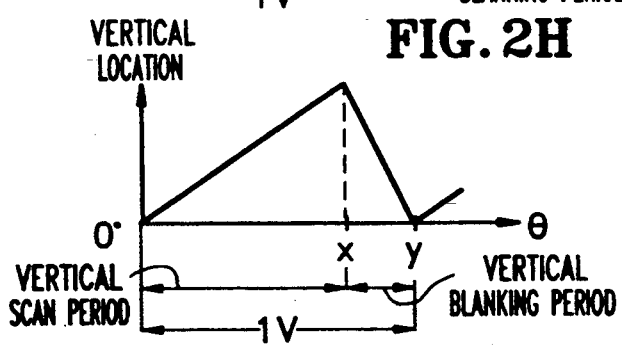

VIDEO DISPLAY DEVICE USING LASER GENERATED RADIATION

BACKGROUND OF THE INVENTION

The present invention relates to a display device using laser in a video apparatus, and, more particular, to a display device for a video tape recorder which freely adjusts the size of a screen by scanning a signal onto a wall or other white surface using a semiconductor laser instead of a cathode ray tube.

In general, cathode ray tubes (CRT) or color picture tubes, employing the emission of an electron beam, are used to reproduce a picture from a video tape recorder. A projection display device using a CRT is disclosed in Japanese patent 2-273782.

The projection display device of JP 2-273782 enlarges a picture displayed on a display medium and projects the enlarged picture using a white optical source onto a large screen, enabling a display with high luminance and high gray level. The device uses a liquid crystal light valve (LCLV) to display an optical image of the CRT onto the screen. Therefore, a CRT for displaying the picture is required.

SUMMARY OF THE INVENTION

Therefore, it is an object of the invention to provide a display device which reproduces a picture and freely adjusts the size of screen without an additional display device by scanning a signal using semiconductor laser onto a wall or a large white surface in a video apparatus.

To accomplish the object, the display device according to the present invention comprises, in a video apparatus, an input path for receiving a composite video signal, a storage device for storing the video signal transmitted from the input path by picture regions which are divided according to the size of the picture, a controller for controlling the scanning position and the division of picture regions by inputting synchronous signals of the video signal transmitted from the input path, a scan device for reading out a signal stored in the storage device, then, converting it to analog R, G and B signals, and then scanning the signals with a laser beam corresponding to the amplitude of the R, G and B signals, and a scanning controller for controlling the path of a laser beam so that the laser beam generated from the scan device is scanned onto a scanning position which is predetermined by the controller.

BRIEF DESCRIPTION OF THE DRAWINGS

The above object and other advantages of the present invention will become more apparent by describing in detail a preferred embodiment of the present invention with reference to the attached drawings in which:

FIGS. 2A through 2H illustrate scanning positions in accordance with the reflection angle of a rotation lens and rotation mirror of the scanning controller shown in FIG. 1;

DETAILED DESCRIPTION OF THE INVENTION

Figure 1:
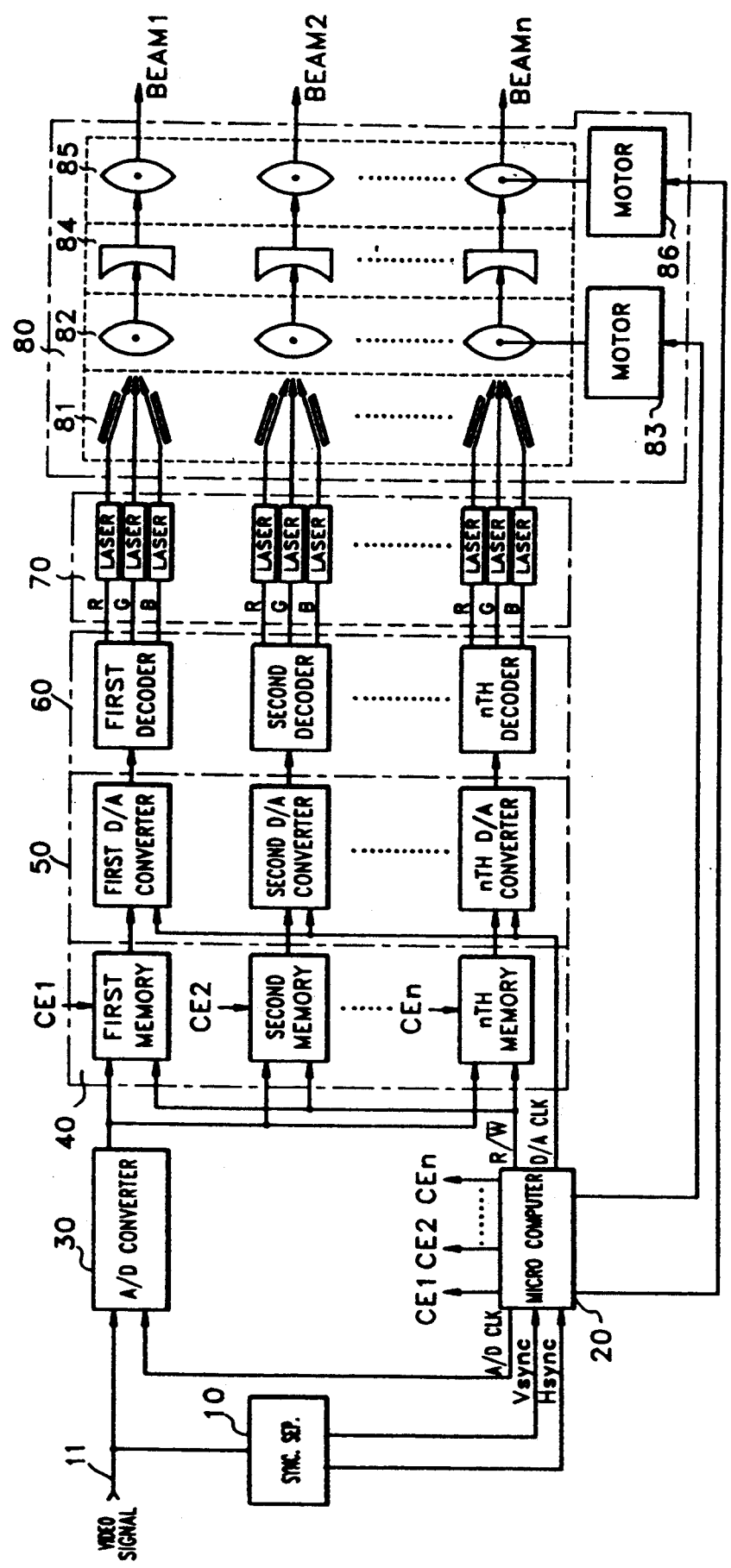
FIG. 1 is a block diagram of a display device using laser according to the present invention.

Referring to FIG. 1, synchronous signal separator 10 separates vertical and horizontal synchronous signals (V-sync and H-sync) from a video signal input from an input path 11.

A microcomputer 20 receives the V-sync and H-sync signals output from synchronous signal separator 10, and generates an A/D clock, a D/A clock, a chip enable signal, a read/write control signal, and driving control signals for motors 83 and 86.

An A/D converter 30 converts the input video signal into a digital signal in accordance with the A/D clock from microcomputer 20.

A memory 40 uses chip enable signals CE1-CEn and a read/write control signal ($R/\overline{W}$) to store the digital video signal from A/D converter 30 in first through nth memories which will correspond to divided display regions. Each chip enable signal is a memory selection control signal output from microcomputer 20, where n is a predetermined number specified by the manufacturer.

D/A converting device 50 includes first through nth D/A converters which read data from memory 40 and convert it to analog signals in accordance with the D/A clock from microcomputer 20.

A signal separator 60 includes first through nth decoders which decode each analog video signal from the first through nth D/A converters and separate them into R, G and B color signals.

Scanning portion 70 includes semiconductor lasers which convert the R, G and B color signals output from each decoder of signal separator 60 into R, G and B laser signals.

Scanning controller 80 comprises converging mirrors 81 for converging the R, G and B laser beams output from the R, G and B semiconductor lasers of scanning portion 70, horizontal control lenses 82 for horizontally deflecting the beams focused by focusing mirrors 81, a motor 83 for controlling the rotation angle of horizontal control lenses 82 according to a horizontal driving control signal output from microcomputer 20, concave lenses 84 for focusing the beams from horizontal control lenses 82, vertical control lenses 85 for vertically deflecting the beams focused on concave lenses 84, and a motor 86 for controlling the rotation angle of vertical control lenses 85 according to a vertical driving control signal output from microcomputer 20.

The operation of the display device shown in FIG. 1 will be described with reference to FIGS. 2A–2H, 3A, and 3B.

Referring FIG. 1, synchronous signal separator 10 separates the V-sync and H-sync signals from an analog video signal, and outputs them to microcomputer 20. The video signal is a composite video signal transmitted from the signal input source of a video camera or TV set.

According to the V-sync and H-sync signals, microcomputer 20 recognizes scanning positions where the video signal input from input path 11 should be displayed on a wall or large white surface.

A/D converter 30 converts an analog video signal to a digital signal timed according to the A/D clock from microcomputer 20.

Memory 40 controls first through nth memories by chip enable signals CE1-CEn output from microcomputer 20. The first through nth memories store data output from A/D converter 30 in designated addresses according to the address signal output from an address generator (not shown) because the displaying screen or wall is divided into n pictures. In other words, contrary to display device using a CRT or picture tube wherein emitted electron beams scan 30 pictures per second onto the CRT screen so that still pictures are recognized as a moving picture due to the viewer's after image sensation, the display device using a laser beam would involve a severe flicker phenomenon in displaying one large picture onto a screen. To prevent flickering, the designer partitions the picture according to its size, then and displays the divided pictures as one.

D/A converter means 50 reads data stored in each corresponding memory, and converts the data to an analog signal in accordance with the D/A clock of from microcomputer 20.

Each decoder of signal separator 60 separates R, G and B color signals from the analog composite video signal output from their corresponding the D/A converter.

Semiconductor laser of scanning portion 70 is converted to a laser signal corresponding to the amplitude of R, G, and B color signals output from the driven decoders of signal separator 60, and the converted laser beam scans a predetermined screen region.

Converging mirrors 81 converge the R, G and B beams to be output to horizontal control lenses 82.

FIG. 2B shows the relation between the horizontal deflection rate and the lens angle of a horizontal control lens shown in FIG. 2A. During one horizontal period 1H, rotation angles 0° through 270° correspond to a horizontal scan period during which the horizontal deflection rate increases, while rotation angles 270° through 360° correspond to a horizontal blanking period during which the horizontal deflection decreases.

At this time, horizontal control polyhedral mirrors as shown in FIG. 2C may be employed instead of the horizontal control lenses. As shown in FIG. 2D, the period when the beam having passed through focusing mirrors 81 strikes surfaces b1, b2, b3 and b4 of the polyhedral mirrors corresponds to a horizontal scan period, and the period when the beam strikes surface a1, a2, a3 and a4 of the polyhedral mirrors corresponds to a horizontal blanking period. The horizontal control lens of FIG. 2A or the polyhedral mirrors for controlling horizontal scan positions, are rotated by motor 83 driven by the horizontal driving control signal from microcomputer 20.

Concave lenses 84 increase the focusing rate of the beam output from horizontal control lenses 82 for determining the horizontal scan position of a picture to be displayed, and the beam signal having passed through concave lenses 84 is transmitted to vertical control lenses 85.

FIG. 2F shows the relation between the vertical deflection rate and the lens angle of a vertical control lens shown in FIG. 2E. During one vertical period 1V, rotation angles 0° through 270° corresponds to a vertical scan period during which the vertical deflection rate increases, while rotation angles 270° through 360° correspond to a vertical blanking period during which the vertical deflection rate decreases. The vertical control lenses may be replaced with the same type polyhedral mirrors shown in FIG. 2C.

As shown in FIG. 2G, given that Y is a vertical scan beginning point and X is a scan end point, the period from Y to X corresponds to a vertical scan period and the period from X to Y is a vertical blanking period. The vertical control lens and polyhedral mirrors are rotated by motor 86 driven by the driving control signal of microcomputer 20, and scanning position is determined by the rotation angle of the vertical control lens or the polyhedral mirrors.

Figure 3A:
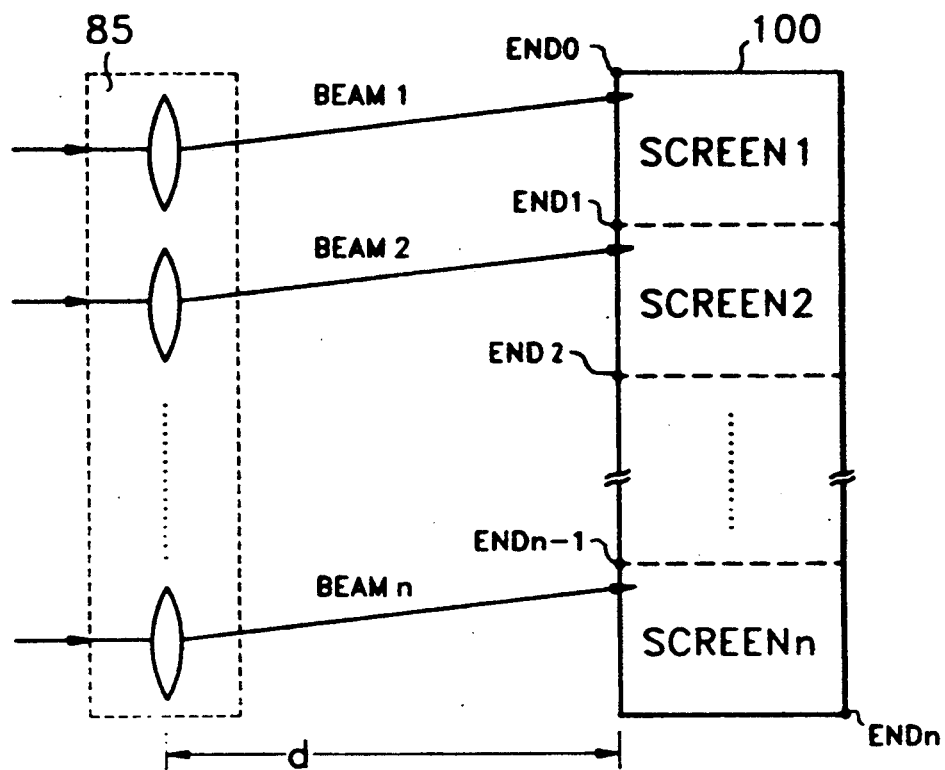
FIG. 3A illustrates picture regions which are divided into screens according to the picture size.

As shown in FIG. 3A, each beam (BEAM1, BEAM2, ... BEAMn) which has passed through a vertical control lens scans its own designated scanning region (SCREEN1, SCREEN2, ... SCREENn) under the control of microcomputer 20. Screen size is determined by a distance d, defined as the distance from vertical control lenses 85 to the screen; the greater the distance d, the larger the screen. Thus, to obtain a sharper picture, the screen size may be controlled by adjusting the distance d. positions, screen start position ENDO through screen end position ENDn, on the screen shown in FIG. 3A, and controls them according to the flowchart shown in FIG. 3B.

Figure 3B:
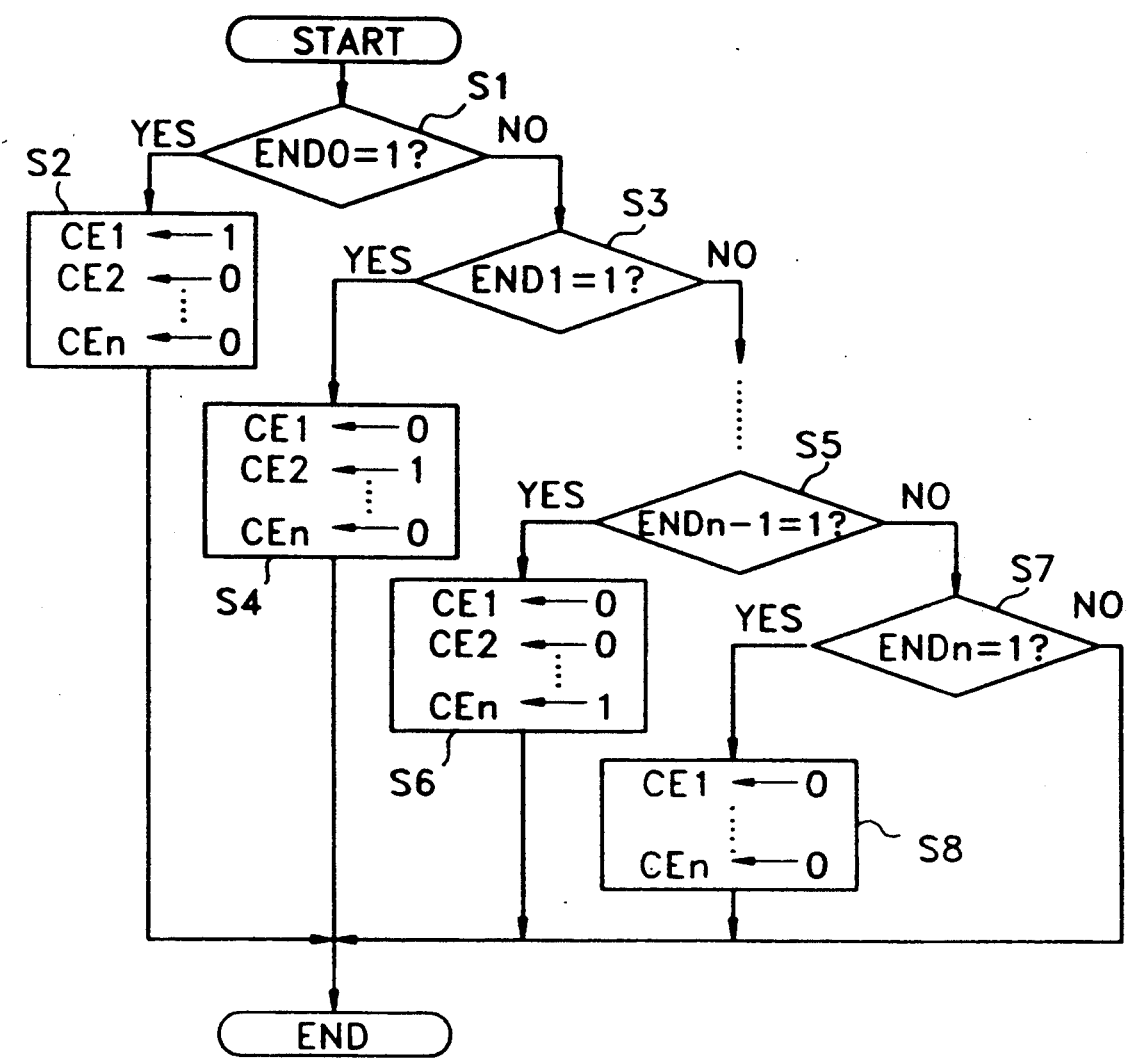
FIG. 3B is a flowchart showing memory control corresponding to the divided picture regions performed in the microcomputer shown in FIG. 1.

Referring to FIG. 3B, step 1 determines whether or not the position on a wall or large white surface where a laser signal is scanned, corresponds to beginning point ENDO of a first screen region SCREEN1 of a segmented screen, If the first screen region SCREEN1 is selected in step S1, the first memory of memory 40 is driven by chip enable signal CE1 and data stored therein is converted into a laser signal in scanning portion 70 to scan the first screen region in step S2.

If first screen area SCREEN1 is not selected as the scan position, step 3 determines whether or not second screen area SCREEN2 is selected. If second screen region SCREEN2 is selected, the second memory of memory 40 is driven by chip enable signal CE2 and data stored therein is converted into a laser signal by scanning portion 70 to be scanned onto second screen area SCREEN2 in step S4.

Step 5 determines whether or not the scan position is to be at the nth screen's beginning position ENDn-1. If the nth screen area SCREENn is selected, the nth memory of memory 40 is driven by chip enable signal CEn, and the output of the nth memory is converted into a laser signal in scanning portion 70 to be scanned onto nth screen area SCREENn in step S6. If nth screen area SCREENn is not selected, step S7 determines whether or not the scan position is at the nth screen's end position ENDn. If in step S7, end position ENDn of nth screen area SCREENn is selected, step S8 establishes that no chip enable signal is output to memory 40 and data stored in memory 40 is not displayed.

As described above in detail, the display device using laser of the present invention converts a video signal into a laser signal using semiconductor laser, controls the scanning positions by rotating lenses or rotating mirrors, and displays the optical signal on a wall or large white surface without an additional display device.

In addition, the display device of the present invention can adjust the screen's size by controlling the distance between the display device using laser and the display surface.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In a video apparatus, a display device using laser generated radiation, said device comprising:
   an input path for receiving video signals;
   synchronous signal separating means for separating horizontal and vertical synchronous signals from said video signals;
   first converting means for converting said video signals into digital signals;
   storage means for storing said digital signals transmitted from said first converting means by picture regions divided according to a size of a displayed picture;
   controlling means for controlling scanning positions and the division of said digital signals into said picture regions in response to said synchronous signals in said video signals;
   a plurality of second converter and decoder means for converting said digital signals stored in said storage means into analog signals and decoding said analog signals to generate red, green and blue analog color signals;
   scan means for reading out stored signals said video signals stored in said storage means, converting said stored signals into analog red, green and blue signals, and scanning said red, green and blue signals with laser beams corresponding to amplitudes of the red, green and blue signals; and
   scan controlling means for controlling paths of said laser beams so that said laser beam generated from said scan means are scanned to said scanning positions under control of said controlling means.

2. A display device as claimed in claim 1, wherein said scan means comprises a plurality of semiconductor lasers.

3. A display device as claimed in claim 2, wherein said scan controlling means comprises:
   focusing mirrors for focusing red, green and blue laser beams generated by said semiconductor lasers;
   horizontal scan control means for horizontally controlling paths of said red, green and blue laser beams focused by said focusing mirrors;
   concave lenses for focusing said red, green and blue laser beams transmitted through said horizontal control scan means; and
   vertical scan control means for vertically controlling paths of said red, green and blue laser beams transmitted through said concave lenses.

4. A display device as claimed in claim 3, wherein said horizontal scan control means and said vertical scan control means comprise polyhedral mirrors.

5. A display device as claimed in claim 4, wherein said scan controlling means further comprises motors for controlling rotation angles of said horizontal scan control means and said vertical scan control means in response to scan position control signals from said controlling means.

6. A display device as claimed in claim 1, wherein said scan controlling means comprises:
   focusing mirrors for focusing red, green and blue laser beams generated by said semiconductor lasers;
   horizontal scan control means for horizontally controlling paths of said red, green and blue laser beams focused by said focusing mirrors;
   concave lenses for focusing said red, green and blue laser beams transmitted through said horizontal control scan means; and
   vertical scan control means for vertically controlling path of said red, green and blue laser beams transmitted through said concave lenses.

7. A display device as claimed in claim 6, wherein said horizontal scan control means and said vertical scan control means comprise polyhedral mirrors.

8. A display device as claimed in claim 7, wherein said scan controlling means further comprises motors for controlling rotation angles of said horizontal scan control means and said vertical scan control means response to scan position control signals from said controlling means.

9. A device as claimed in claim 1, wherein a size of a display of said video signals generated by said scan means is user adjustable by changing a distance between said scan means and a field onto which the display is generated.

10. In a video apparatus, a display device using laser generated radiation, said device comprising:
    synchronous signal separating means for separating horizontal and vertical synchronous signals from video signals;
    first converting means for converting said video signals into digital signals;
    control means for receiving said horizontal and vertical synchronous signals from said synchronous signal separating means, and controlling division of picture regions defined according to scan positions and a size of a displayed picture;
    storage means comprising a plurality of memories for storing said digital signals from said first converter means by said picture regions;
    a plurality of second converter and decoder means for converting said digital signals stored in said storage means into analog signals and decoding said analog signals to generate red, green and blue analog color signals;
    scan means scanning with laser beams according to amplitudes of said red, green and blue analog color signals from said plurality of second converter means; and
    scan control means for controlling the path of said laser beams from said scan means so that said laser beams are scanned onto said scan positions by said control means.

11. A display device as claimed in claim 10, wherein said scan means comprises a plurality of semiconductor lasers.

12. A display device as claimed in claim 11, where said scan control means comprises:
    focusing mirrors for focusing red, green and blue laser beams from said semiconductor lasers;
    horizontal control means for horizontally controlling paths of said red, green and blue laser beams from said focusing mirrors;
    concave lenses for focusing the red, green and blue laser beams from said horizontal control means; and
    vertical scan control means for vertically controlling paths of said red, green and blue laser beams from said concave lenses.

13. A display device using laser as claimed in claim 12, wherein said horizontal control means and said vertical control means comprise polyhedral mirrors.

14. A display device using laser as claimed in claim 13, wherein said scan control means further comprises motors for controlling rotation angle of said horizontal control means and said vertical control means in response to scan position control signals from said control means.

15. A display device as claimed in claim 10, wherein said scan control means comprises:
   focusing mirrors for focusing red, green and blue laser beams from said semiconductor lasers;
   horizontal control means for horizontally controlling paths of said red, green and blue laser beams from said focusing mirrors;
   concave lenses for focusing the red, green and blue laser beams from said horizontal control means; and
   vertical control means for vertically controlling path of said red, green and blue laser beams from said concave lenses.

16. A display device using laser as claimed in claim 15, wherein said horizontal control means and said vertical control means comprise polyhedral mirrors.

17. A display device using laser as claimed in claim 16, wherein said scan control means further comprises motors for controlling rotation angle of said horizontal control means and said vertical control means in response to scan position control signals from said control means.

18. A device as claimed in claim , wherein a size of a display of said video signals generated by said scan means with said laser beams is user adjustable by changing a distance between said scan means and a field onto which the display is generated.

19. A video display device using laser generated radiation, said device comprising:
   means for spatially dividing video signals of a single channel into a plurality of picture regions; and
   a plurality of laser display means for collectively generating a video display with the laser generated radiation, each of said laser display means for only projecting a different one of said picture regions, each of said laser display means comprising:
   first means for focusing said laser generated radiation;
   first axis scan control means for deflecting said laser generated radiation focused by said first focusing means parallel to a first axis;
   second focusing means for further focusing said laser generated radiation deflected by said first axis scan control means; and
   second axis scan control means for deflecting said laser generated radiation focused by said second focusing means parallel to a second axis, said first axis being perpendicular to said second axis.

20. A device as claimed in claim 19, wherein said spatially dividing means comprises:
   a plurality of memories, each of said memories for storing different portions of said video signals, each one of said different portions of said video signals corresponding to a different one of said picture regions; and
   control means for sequentially enabling each one of said plurality of memories to store said different portions of said video signals in response to synchronizing signals separated from said video signals.

21. A device as claimed in claim 20, further comprising analog-to-digital converter means for converting said video signals from analog to digital and then providing said video signals to said plurality of memories.

22. A device as claimed in claim 20, further comprising decoder means for receiving said video signals stored by said plurality of memories and decoding said video signals into red, green and blue component video signals; and wherein said laser display means comprises red, green and blue lasers receiving said red, green and blue component video signals, respectively.

23. A scanning device as claimed in claim 19, wherein said first axis scan control means and said second axis scan control means each comprise rotating planar reflective faces.

24. The video display device as claimed in claim 19, further comprised of said first focusing means comprising a converging mirror and said second focusing means comprising a concave lense.

25. The video display device as claimed in claim 19, further comprised of said first and second axis scan control means comprising polyhedral mirrors.

26. In a display device using laser generated radiation, a scanning device for projecting video images for raster scanning the laser generated radiation, said scanning device comprising:
   focusing mirrors for focusing said laser generated radiation;
   first axis scan control means for deflecting said laser generated radiation focused by said focusing mirrors parallel to a first axis;
   a concave lens for further focusing said laser generated radiation deflected by said first axis scan control means; and
   second axis scan control means for deflecting said laser generated radiation focused by said concave lens parallel to a second axis, said first axis being perpendicular to said second axis.

27. A scanning device as claimed in claim 26, wherein said first axis scan control means and said second axis can scan control means each comprise rotating planar reflective surfaces.

28. A scanning device as claimed in claim 27, wherein ratios of lengths of line segments defined by said laser generated radiation impinging on said reflective faces during rotation correspond to ratios of a horizontal scan period to a horizontal blanking period and ratios of a vertical scan period to a vertical blanking period.

29. A scanning device as claimed in claim 26, said device further comprising:
   means for spatially dividing received video signals of a single channel into a plurality of picture regions; and
   laser radiation generating means for generating said laser generated radiation of only one of said picture regions.

30. A process for generating a display using laser generated radiation, said process comprising the steps of:
   spatially dividing received video signals of a single channel into a plurality of picture regions and storing each of said picture regions in a plurality of memories; and
   collectively generating a video display with the laser generated radiation produced by a plurality of lasers and raster scanned onto a field by a scanning device, each of said lasers operating in response to a different one of picture regions stored by a different one of said memories, said scanning device raster scanning each of said picture regions using said laser generated radiation by deflecting said laser generated radiation along a first axis, then focusing said laser generated radiation, and then deflecting said laser generated radiation along a second axis, said second axis perpendicular to said first axis.

31. A display device using laser generated radiation, said device comprising:
- synchronous signal separating means for separating horizontal and vertical synchronous signals from said video signals;
- control means for receiving said horizontal and vertical synchronous signals from said synchronous signal separating means, and controlling division of picture regions defined according to scan regions and a size of a displayed picture;
- storage means comprising a plurality of memories for storing said video signals according to said picture regions;
- a plurality of converter and decoder means for converting said video signals stored in said storage means into analogue signals and decoding said analogue signals to generate red, green and blue analog color signals;
- scan means for scanning with laser beams according to amplitudes of said red, green and blue analog color signals from said plurality of converter means; and
- scan control means for controlling a path of said laser beam from said scan means so that said laser beams are scanned onto said scan position by said control means.

32. The display device as claimed in claim 31, further comprised of said scan control means comprising:
- first means for focusing said laser generated radiation;
- first access scan control means for deflecting said laser generated radiation focused by said first focusing means parallel to a first axis;
- second focusing means for further focusing said laser generated radiation deflected by said first axis scan control means; and
- second axis scan control means for deflecting said laser generated radiation focused by said second focusing means parallel to a second axis, said first axis being perpendicular to said second axis.

* * * * *